(12) United States Patent
Lohr (10) Patent No.: US 10,091,171 B2
(45) Date of Patent: Oct. 2, 2018

(54) ADAPTIVE TRAFFIC ENCRYPTION FOR OPTICAL NETWORKS

(71) Applicant: Alcatel Lucent, Boulogne Billancourt (FR)

(72) Inventor: Jurgen Lohr, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 14/896,708

(22) PCT Filed: Jul. 15, 2014

(86) PCT No.: PCT/EP2014/065074
§ 371 (c)(1),
(2) Date: Dec. 8, 2015

(87) PCT Pub. No.: WO2015/014597
PCT Pub. Date: Feb. 5, 2015

(65) Prior Publication Data
US 2016/0149867 A1  May 26, 2016

(30) Foreign Application Priority Data
Jul. 29, 2013  (EP) ..................... 13306094

(51) Int. Cl.
*H04L 29/06*  (2006.01)
*H04L 9/00*  (2006.01)
(Continued)

(52) U.S. Cl.
CPC ......... *H04L 63/0428* (2013.01); *H04B 10/85* (2013.01); *H04L 9/006* (2013.01); *H04L 9/0822* (2013.01); *H04L 9/0825* (2013.01)

(58) Field of Classification Search
CPC ... H04L 9/00; H04L 9/006; H04L 9/08; H04L 9/0819; H04L 9/0822; H04L 9/0825;
(Continued)

(56) References Cited

U.S. PATENT DOCUMENTS 6,202,150 B1 * 3/2001 Young ............... H04L 9/0869
713/155
6,651,166 B1 * 11/2003 Smith ............... G06F 21/606
380/277
(Continued)

FOREIGN PATENT DOCUMENTS

CN  101394395  3/2009
CN  101662705  3/2010
(Continued)

OTHER PUBLICATIONS

Walker, Timothy "Optical Transport Network (OTN) Tutorial" [Online] Mar. 8, 2013 [Retrieved on: May 7, 2018], International Telecommunication Union (ITU), www.itu.net, Retrieved from: < https://web.archive.org/web/20130308180404/https://www.itu.int/ITU-T/studygroups/com15/otn/OTNtutorial.pdf > (Year: 2013).*
(Continued)

*Primary Examiner* — Eric W Shepperd
(74) *Attorney, Agent, or Firm* — Patti & Malvone Law Group, LLC (57) ABSTRACT

A technique is provided for a transmitting optical network element with an encrypting entity. The transmitting optical network element has an interface for receiving key information from a key management entity, storage means for storing a public key received by the key management entity, and a key generation entity configured for generating a symmetric encryption key. The transmitting optical network element is adapted to encrypt a received payload to be transmitted to a receiving optical network element using the generated symmetric encryption key, encrypt the generated
(Continued)

symmetric encryption key using the public key of the receiving optical network element, and transmit the encrypted payload and the encrypted symmetric encryption key via an optical network to the receiving optical network element.

14 Claims, 5 Drawing Sheets

(51) Int. Cl.
*H04L 9/08* (2006.01)
*H04B 10/85* (2013.01)

(58) Field of Classification Search
CPC ... H04L 9/083; H04L 9/12; H04L 9/32; H04L 9/3244; H04L 9/3247; H04L 63/04; H04L 63/0428; H04L 63/045
See application file for complete search history.

(56) References Cited

U.S. PATENT DOCUMENTS

| | | | |
|---|---|---|---|
| 6,868,160 B1* | 3/2005 | Raji | H04L 9/302 380/277 |
| 7,106,862 B1 | 9/2006 | Blair et al. | |
| 2002/0027929 A1* | 3/2002 | Eaves | H04J 3/07 370/505 |
| 2003/0021417 A1* | 1/2003 | Vasic | G06F 17/30067 380/277 |
| 2003/0061481 A1* | 3/2003 | Levine | H04L 9/0836 713/163 |
| 2003/0223401 A1* | 12/2003 | Lautenschlager | H04J 3/0605 370/351 |
| 2005/0017602 A1 | 1/2005 | Arms et al. | |
| 2005/0021946 A1* | 1/2005 | Narayanan | H04L 45/00 713/163 |
| 2005/0175183 A1 | 8/2005 | Ovadia et al. | |
| 2005/0177713 A1 | 8/2005 | Sim | |
| 2005/0177749 A1 | 8/2005 | Ovadia | |
| 2005/0204161 A1* | 9/2005 | Caronni | H04L 9/0822 726/5 |
| 2006/0031299 A1* | 2/2006 | Robertson | G06Q 10/107 709/206 |
| 2006/0291664 A1* | 12/2006 | Suarez | G06F 21/33 380/286 |
| 2010/0111307 A1 | 5/2010 | Hu et al. | |
| 2010/0202612 A1* | 8/2010 | Nema | H04L 63/068 380/256 |
| 2012/0188906 A1* | 7/2012 | Ong | H04L 45/42 370/254 |
| 2012/0263475 A1* | 10/2012 | Su | H04J 3/1652 398/100 |

FOREIGN PATENT DOCUMENTS

| | | |
|---|---|---|
| JP | H10271106 | 10/1998 |
| JP | 2005260358 | 9/2005 |

OTHER PUBLICATIONS

Kubota, H.; KVH Announces Nation's First Encryption Service for 10G Ethernet Leased Line, [online], Feb. 23, 2012, [Searched on Feb. 10, 2017], Internet <=""font="">http://itpro.nikkeibp.co.jp/article/NEWS/20120223/382744/?rt=nocnt>.

AppliedMicro Announces Key Technology for Rapidly Expanding OTN Market, [online], Mar. 8, 2013, [Searched on Feb. 10, 2017], Internet<=""font="">https://www.apm.com/appliedmicro-announces-key-technology-for-rapidly-expanding-otn-market/>.

DVB Organization; Bread—Deliverable D22-D32—Annex 2.10012006.doc; DVB, Digital Video Broadcasting, C/O EBU—17A Ancienne Route—CH-1218 Grand Saconnex, Geneva—Switzerland; Jan. 23, 2006; XP017800049; 289 Pages.

Data-Over-Cable Service Interface Specifications DOCSIS 3.0 Security Specification; Oct. 2, 2009; XP055098957; Retrieved from the Internet: URL:https://dspace.ist.utl.pt/bitstream/2295/1047813/1/CM-SP-SECv3.0-I11-091002.pdf; [retrieved on Jan. 28, 2014]; 226 pages.

FIPS PUB 186-2; Federal Information Processing Standards Publication; Jan. 27, 2000; Archived Publication; http://csrc.nist.gov/publications/PubsFIPS.html#fips186-3.

IEEE Std 1363-2000; IEEE Standard Specifications for Public-Key Cryptography; IEEE-SA Standards Board; Jan. 30, 2000; The Institute of Electrical and Electronics Engineers, Inc.; 2000; US.

NIST SP 800-90A; NIST Special Publication 800-90A; Recommendation for Random Number Generation Using Deterministic Random Bit Generators; National Institute of Standards and Technology; Technology Administration, U.S. Department of Commerce; Jan. 2012; US.

\* cited by examiner

ADAPTIVE TRAFFIC ENCRYPTION FOR OPTICAL NETWORKS

BACKGROUND

The present document relates to adaptive traffic encryption. In particular, the present document relates to encryption of optical signals for flexible optical networks by using hybrid encryption.

Known encryption solutions for optical networks are fixed with respect to their end points. The optical network elements communicating with each other, e.g. client interfaces or endpoints of an optical link, implement a static encryption function in order to encrypt the payload transmitted between said optical network elements. Thereby, the optical network elements are connected to each other in a static way. Optical network encryption is typically implemented by a line encryption, i.e. encrypting a certain channel of a wavelength division multiplex (WDM) link, or by client encryption, e.g. transmitting a client signal between two optical network elements. The encryption parameters needed to encrypt the payload are provided by a central instance, e.g. a network management system or key management entity. Specifically, said central instance provides the encryption key(s) to optical network elements by means of which the payload is encrypted, and optionally policies for key replacement, e.g. after a certain key lifetime.

For setting up the static relation between the concerned optical network elements in order to obtain an encrypted optical transmission path, related encryption parameters, e.g. the encryption keys, are configured to the optical network elements from the central instance. This is a complex and time-consuming process, as the encryption parameters need to be generated and transmitted in a safe and secure way to the optical network elements. Each break in safety and security of key generation, transmission and implementation breaks the security of the signal encryption.

Typically, symmetric encryption schemes are used, e.g. Advanced Encryption Standard (AES) encryption, that require the same key for encryption and decryption. Therefore the encryption parameters have to be transmitted separately to the optical network elements because said optical network elements are located at different locations.

Above mentioned approach is unsuitable for flexible optical networks, i.e. an optical network with frequently changing connections between a plurality of optical network elements, because each time after a connection reconfiguration, a time-consuming process for providing encryption parameters to the optical network elements has to be performed. Because of the operational complexity of this process, said connection reconfiguration may be performed only slowly, limiting the responsiveness of the network to service requests changing the connection reconfiguration.

A general drawback of symmetric encryption schemes is that in case a key is compromised, i.e. known to an unauthorized third-party, this third-party can perform a man-in-the-middle attack, gaining access to the unencrypted (clear) payload and potentially modifying it without an option for the legitimate optical network element or user to notice this attack.

Thus, there is a need to provide for an improved flexible traffic encryption scheme for optical networks which provides a short response time after requesting a connection reconfiguration paired with a high availability and reliability of the encrypted services in the optical network.

According to a first aspect, a transmitting optical network element is described. The transmitting optical network element may comprise an encrypting entity which is adapted to encrypt a payload signal received by the transmitting optical network element. Said payload signal may be, for example an Ethernet signal or a WDM link of an optical transport system. The transmitting optical network element further comprises an interface for receiving key information from a key management entity. The key management entity may be a central instance for providing key information for the transmitting optical network element and other network elements. Preferably said key management entity provides the key information at the setup of the transmitting optical network element. After said setup, no exchange of key information between the transmitting optical network element and the key management entity is necessary, but may optionally be done in support of key replacement, e.g. as part of key lifetime policies.

In order to store the received key information, the transmitting optical network element further comprises storage means for storing at least a public key received by the key management entity wherein the public key is associated with a receiving optical network element being connected to the transmitting optical network element via an optical network in order to transmit data. Preferably, the key information is asymmetric key information consisting of an associated pair of keys, namely a public key and a private key.

Furthermore, the transmitting optical network element comprises a key generation entity configured for generating a symmetric encryption key. Based on the asymmetric key information provided by the key management entity and said symmetric encryption key, the transmitting optical network element is adapted to perform a hybrid encryption scheme resulting in a highly flexible reconfiguration of the optical system after a demand for reconfiguration or connectivity change.

In order to perform the hybrid encryption scheme, the transmitting optical network element may comprise means for and/or be adapted to encrypt a received payload to be transmitted to the receiving optical network element using the generated symmetric encryption key. The transmitting optical network element may further encrypt the generated symmetric encryption key using the public key of the receiving optical network element. Using a symmetric encryption scheme allows for a quick and nearly simultaneous encryption of the payload data, whereas the secured exchange of the symmetric encryption key is performed using asymmetric encryption because the speed requirements in exchanging the symmetric encryption key are much lower than the speed requirements for encrypting the payload.

After encryption, the encrypted payload and the encrypted symmetric encryption key may be transmitted via an optical network to the receiving optical network element by the transmitting optical network element.

The main advantage of the proposed transmitting optical network element is that it allows for high connection flexibility in the encrypted optical network without the need of a central instance to be involved during connectivity changes. Thereby, connectivity changes can be performed in a short period of time t, preferably t<200 ms, most preferably t<50 ms. Thereby a highly available, quick and reliable encrypted optical network is obtained.

A further advantage of the proposed transmitting optical network element is that no transfer of symmetric encryption keys between a central instance and the transmitting or receiving optical network elements is necessary. Thereby the risk of a key getting compromised and the risk of man-in-the-middle attacks are reduced.

According to embodiments, the optical network comprises a plurality of receiving optical network elements. The storage means of the transmitting optical network element are adapted to store a private key associated with said transmitting optical network element and the public keys of all receiving optical network elements that are configured to receive data of said transmitting optical network element or that are expected to receive data in the future. Said private key and said public keys may be provided by the key management entity to the transmitting optical network element. By means of the public key of the respective receiving optical network elements, the transmitting optical network element is able to encrypt information, e.g. the symmetric encryption key, in order to transmit the information to the respective receiving optical network element. Preferably, the transmitting optical network element is adapted to choose the appropriate public key depending on the currently selected receiving optical network element to communicate with. Only the currently selected receiving optical network element is able to decrypt the encrypted symmetric encryption key with its own private key.

According to embodiments, in case of a connectivity change from a first receiving optical network element to a second receiving optical network element, the transmitting optical network element is adapted to generate a new symmetric encryption key for encrypting the payload and to encrypt the new symmetric encryption key using the public key of the second receiving optical network element. The new symmetric encryption key may be generated by a cryptographically secure pseudo-random number generator (CSPRNG), wherein the new symmetric encryption key may be a pseudo-random number. Said CSPRNG may be implemented in hardware or software, e.g. in a process or, field-programmable gate array (FPGA), operating system, etc. . . . Preferably, the CSPRNG is located in the encryption entity or close to the encryption entity of the transmitting network element, thus avoiding the communication of the generated symmetric encryption key over potentially unsecure and unsafe channels. After generation of the new symmetric encryption key and encrypting said symmetric encryption key with the public key of the second receiving optical network element, the encrypted new symmetric encryption key is transmitted to the second receiving optical network element which is then able to decrypt the encrypted new generated symmetric encryption key using its own private key. By using the decrypted new generated symmetric encryption key, the second receiving optical network element is able to decrypt the encrypted payload (encrypted with the new generated symmetric encryption key) thereby obtaining the decrypted payload. Thus, a change of connectivity may be achieved without the involvement of an external, central instance.

According to embodiments, the encrypted symmetric encryption key or at least a part of the encrypted symmetric encryption key is transmitted simultaneously and/or continuously with the encrypted payload. Thereby, the time window for changing the setup of connectivity may be decreased. Preferably, the encrypted payload is transmitted in a payload section of a data frame, and the encrypted symmetric encryption key is transmitted using an overhead section within said data frame or otherwise embedded in the data frame. The data frame may be for example the ODUk (Optical Channel Data Unit-k) of an optical transport network (OTN). The encrypted symmetric encryption key may be transmitted embedded in some or all data frames.

According to embodiments, the transmitting optical network element may comprise means for authenticating the key information received from a key management entity, e.g. using the means of a public-key infrastructure (PKI).

The transmitting optical network element may further create a signature of a shared secret only known by the transmitting optical network element and the receiving optical network element. Any shared secret may be used for this purpose. Further, the transmitting optical network element may encrypt the signature with its own private key and transmit the encrypted signature to the receiving optical network element in order to authenticate itself at the receiving optical network element. This authentication may be done at least once upon setup of the service between the transmitting optical network element and the receiving optical network element. Preferably, the authentication is done more frequently, e.g. regularly in fixed time intervals.

In order to authenticate the transmitting optical network element, the receiving optical network element may receive a signature of a shared secret only known by the transmitting optical network element and the receiving optical network element, wherein the signature is encrypted by the private key of the transmitting optical network element. The receiving optical network element may decrypt the signature with the public key of the transmitting optical network element, which is known to the receiving optical network element, and generate a second signature of the shared secret. Next, the decrypted signature is compared with the second signature in order to authenticate the transmitting optical network element. Thereby, the acting transmitting and receiving optical network elements are authenticated and men-in-the-middle or denial-of-service attacks can be prohibited.

According to embodiments, the transmitting optical network element is configured to create the signature of a shared secret by applying a cryptographic hash function on this information. Thereby, the symmetric encryption key can be used as shared secret because the hashed symmetric encryption key cannot be decrypted even if un-authorized network element may receive this information. Thus, the symmetric encryption key can be used for encrypting the payload as well as for authorizing the acting transmitting and receiving optical network elements. Optionally, additional information may be used to form the shared secret, e.g. parts of the payload, or counter values that are synchronized between the transmitting optical network element and the receiving optical network element.

According to embodiments, the transmitting optical network element and/or the receiving optical network element are adapted as transceivers. Preferably, the transceiver comprises an encrypting entity for encrypting the payload to be transmitted and a decrypting entity for decrypting a received payload. Thereby it's possible to establish a bidirectional encrypted optical communication link between at least two of said transceivers. Said transceivers may use the same symmetric encryption key or different symmetric encryption keys for encrypting and decrypting the payload of the two respective directions of the bidirectional link.

According to a further aspect, a receiving optical network element is described. The receiving optical network element may be connected to a transmitting optical network element in order to receive data. The receiving optical network element may comprise a decrypting entity; an interface for receiving key information from a key management entity; and storage means for storing at least its own private key received by the key management entity. Furthermore the receiving optical network element may receive an encrypted symmetric encryption key and an encrypted payload; decrypt the received symmetric encryption key generated and transmitted by the transmitting optical network element using its own private key; and decrypt the received encrypted payload using the decrypted received symmetric encryption key.

According to embodiments, the receiving optical network element may comprise storages means adapted to store at least its own private key and at least one public key received by the key management entity wherein the public key is associated with a transmitting optical network element being connectable to the receiving optical network element in order to transmit data. Preferably, the storage means may be adapted to store a plurality of public keys associated with other optical network elements of the optical network in order to be ready to receive an encrypted symmetric key from one of the other optical network elements for setting up a network connection with this optical network element.

According to a further aspect, a method for encrypted transmission of data in an optical network comprising a transmitting optical network element and a receiving optical network element is described. The method comprises receiving of asymmetric key information from a key management entity by the transmitting optical network element and the receiving optical network element. The asymmetric key information received by the transmitting optical network element comprises at least the public key of the receiving optical network element and the asymmetric key information received by the receiving optical network element comprises at least the private key of said receiving optical network element.

Further, receiving a payload to be encrypted by the transmitting optical network element; generating a symmetric encryption key by means of a key generation entity of the transmitting optical network element; and encrypting the payload using the generated symmetric encryption key by means of the transmitting optical network element may be provided. The method may comprise encrypting the generated symmetric encryption key by means of the transmitting optical network element using the public key of the receiving optical network element; transmitting the encrypted payload and the encrypted symmetric encryption key to the receiving optical network element; decrypting the symmetric encryption key by the receiving optical network element using the private key; and decrypting the encrypted payload by the receiving optical network element using the decrypted symmetric encryption key.

According to embodiments, the optical network comprises a plurality of optical network elements, namely at least one transmitting optical network element and a plurality of receiving optical network elements and the transmitting optical network element and each receiving optical network element receive its own private key and the public keys of all other optical network elements in order to be ready to receive an encrypted symmetric key from one of the other optical network elements for setting up a network connection with this optical network element.

According to embodiments, the encrypted symmetric encryption key is transmitted simultaneously and/or continuously to the receiving optical network element, thereby allowing a continuous update of the symmetric encryption key, e.g. in case of a symmetric encryption key having validity for only a limited time, e.g. if said symmetric encryption key is a session key which is renewed periodically (after a certain period of time, e.g. after ten minutes) or after occurrence of a certain event (e.g. a new network configuration).

According to embodiments, in case of a connectivity change from a first receiving optical network element to a second receiving optical network element, the transmitting optical network element performs the following steps: encrypting the symmetric encryption key by using the public key of the second receiving optical network element instead of using the public key of the first receiving optical network element; generating a new symmetric encryption key; encrypting the payload with the new symmetric encryption key; and encrypting the new symmetric encryption key by using the public key of the second receiving optical network element.

The second receiving optical network element may perform the following steps: decrypting the new symmetric encryption key with its own private key; and decrypting the payload using the decrypted symmetric encryption key.

It should be noted that the methods and systems including its embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

BRIEF DESCRIPTION OF DRAWINGS

The invention is explained below in an exemplary manner with reference to the accompanying drawings, wherein FIG. 1 schematically illustrates an optical system for transmitting encrypted data.

DETAILED DESCRIPTION

Known encryption solutions for optical networks are typically fixed with respect to their end-points, i.e. two end-points (e.g. client interfaces, end points of an optical link) implementing an encryption function are connected to each other in a static way, and are configured with the needed encryption parameters (e.g. encryption key) by a central component. While this is sufficient for a static setup with fixed end-points and fixed connection between them, it becomes unpractical when the optical network becomes flexible, i.e. frequent changes of connectivity between a bigger set of end-points (e.g. Generalized Multiprotocol Label Switching (GMPLS) control plane or software-defined networking (SDN) driven). In this case each time the connectivity is changed, a related new encryption configuration needs to be safely and securely implemented in the optical network. The endpoints are in the following also called transmitting, respectively, receiving optical network element. By optical network, any technology on L0 or L1 is implied, e.g. dense wavelength division multiplex (DWDM) and coarse wavelength division multiplex (CWDM) with wavelengths as services, OTN with ODUk as services, Synchronous Digital Hierarchy (SDH)/Synchronous Optical Networking (SONET) with virtual containers (VC-n)/synchronous transport signals (STS-n) as services etc.

Typical optical systems implement encryption with either line encryption (e.g. for an higher order optical channel data unit (HO ODUk) in a wavelength on a DWDM link) or client encryption (e.g. an optical channel payload unit k (OPUk) with a mapped client signal between two dense wavelength division multiplex optical transport (DWDM OT) cards) for a static relation between the two end-points. When the static relation is set up, related encryption parameters (e.g. keys) are configured to the end-points from a central instance, e.g. a Network Management System or a Key Management Tool. This is a complex and delicate process and potentially time consuming, as keys need to be generated and transmitted safe and secure—each break in safety and security of key generation, transmission and implementation breaks the security of the signal encryption. Known implementations use symmetric encryption schemes, e.g. AES as defined by National Institute of Standards and Technology (NIST), that require the same key for encryption and decryption. As the points of encryption and decryption are separated, secure communication of the keys is required.

Using this approach for flexible optical networks, i.e. with frequently changing connections between more than two, potentially many, end-points, a key management process with all implied risks and complexities needs to be executed for each new connection. This is operationally complex and potentially slow, limiting the responsiveness of the network to service requests. In addition, it requires high availability of the central component and its communication to the end points. (For example: reconfiguration may be needed in <50 msec if encryption is used in the context of n:1 encryption schemes, or in <e.g. 2000 msec if used in GMPLS control plane controlled networks.)

A new approach to the above problem, following the principles of hybrid encryption is suggested:

- A central instance, e.g. a Network Management System or Key Management Tool, creates for each end-point an asymmetric key pair (public key and private key that are associated) as for public-key encryption. The private key is communicated only to the related end-point; the public key is communicated to all other end-points. This is done only when a new end-point is created (and not needed on connectivity changes/service setup).
- The created asymmetric keys can optionally be authenticated using certificates, providing authenticated identification of the key validity by the receiving encryption end-points.
- Each encrypting end-point, in the following also referred to as transmitting optical network element, locally creates when required by the used symmetric encryption scheme, or possibly more frequently, a symmetric encryption key used for encrypting the payload using a symmetric encryption scheme (e.g. AES). This may be done using a Cryptographically Secure Pseudo-Random Number Generator (CSPRNG).
- The encrypting end-point encrypts the payload with this locally generated symmetric encryption key and sends it out to the decrypting end-point, in the following also referred to as receiving optical network element.
- The encrypting end-point encrypts the symmetric encryption key with the public key of the decrypting end-point and sends it out to the decrypting end-point.
- The decrypting end-point uses its private key to decrypt the encrypted symmetric key, thus recovering the symmetric encryption key. Only the targeted decryption end-point can do so as the encryption was done with its end-point specific public key.
- The decrypting end-point uses then the recovered symmetric encryption key to decrypt the payload.

This scheme extends the known hybrid encryption scheme (that is covering 2 communication partners) to multiple potential communication partners by making the public key of an end-point known to all other end-points, and by informing the encrypting end-point on to which decrypting end-point the encrypted payload is sent (thus allowing the encrypting end-point to use the related public key of the respective decrypting end-point).

The scheme as described allows any node in the network to send encrypted traffic to a specific decrypting end-point, as all other nodes already have the necessary information and means to do so. This leaves potential for e.g. denial-of-service attacks without an explicit way to detect this. So optionally, additional authentication of both end-points can be supported, eliminating this risk.

The encrypting end-point may create a signature of some information that only itself and the decrypting end-points have, e.g. the unencrypted or encrypted symmetric encryption key, e.g. by applying a cryptographic hash function on this and optionally additional information. The resulting signature is encrypted with the private key of the encoding end-point, and sent to the decrypting end-point. The decrypting end-point uses the public key of the encrypting end-point to decrypt the signature. The decrypting end-point may perform the same function to create the signature as the encrypting end-point, based on the same information. Finally, the decrypting end-point compares the two signatures. If they match, the encrypting end-point is authenticated (also supported by the option to authenticate the keys via certificates). If they do not match, it can be suspected that some other than the intended encrypting end-point sends traffic to the decrypting end-point, indicating the potential for a denial-of-service or man-in-the-middle attack.

This scheme of hybrid encryption is mapped specifically on flexible optical networks so that they become adaptive to frequent connectivity changes between multiple end-points. Encryption and decryption end-points may be ports of an optical network, e.g. Ethernet or TDM client ports, or OTN DWDM line ports, of an optical transport system. The encrypting end-point may implement a CSPRNG in hardware and/or software in the optical network element close to the point of encryption (e.g. on the same card that performs the encryption) thus avoiding the communication of the generated symmetric encryption key over potentially unsecure and unsafe channels (thus avoiding its communication as in today's solution from e.g. a Key Management Tool to the encrypting network element), instead limiting the knowledge of the symmetric encryption key to a small scope (potentially limited to one hardware component, e.g. an ASIC/FPGA/ASSP).

The payload, e.g. an OPUk (optical channel payload unit k) that is going to be mapped into a corresponding ODUk (Optical Channel Data Unit-k), is encrypted using the symmetric encryption key, and the resulting encrypted OPUk is mapped into the corresponding ODUk. The encrypted (using the decrypter's public key) symmetric encryption key is mapped into transport overhead, e.g. the ODUk overhead associated to the OPUk that is encrypted using this symmetric encryption key. The encrypting end-point is informed on which is the related decrypting end-point (so that it can use the proper public key) either by a network controlling instance (e.g. the one that also reconfigures the connectivity in the optical network), or by distributed mechanisms that influence the connectivity in the optical network (e.g. a data plane related protection mechanism such as n:1 path protection, or a GMPLS control plane). Also mixed scenarios are possible.

When the encrypting end-point is connected to a new decrypting end-point due to a changed connectivity in the optical network, it already has all information it needs (i.e. the public key of the new decrypting end-point and the local ability to create a new symmetric encryption key) to immediately perform encryption in a way that allows the new decrypting end-point to properly decrypt the payload, without any other party being able to do so. No central entity (e.g. Key Management Tool) is needed in this process.

This also has the advantage of higher availability of the encryption solution facing connectivity changes in the optical network as no dependency on the central entity and its safe and secure communication to the end-points exists. The proposed mechanisms may be combined with additional mechanisms that provide integrity checks/authentication for the payload, e.g. Galois/Counter Mode (GCM) encryption as standardized by NIST.

Figure 1:
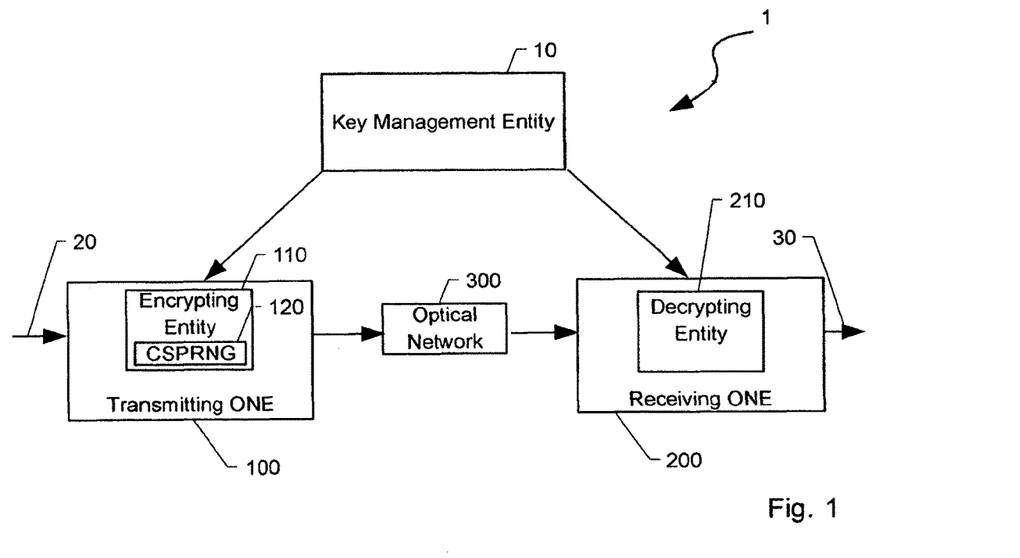

FIG. 1 shows an optical system 1 for transmitting encrypted data. The system comprises at least one transmitting optical network element 100, connected via an optical network 300 with at least one receiving optical network element 200. The optical network 300 may be a DWDM (dense wavelength division multiplex) or CWDM (coarse wavelength division multiplex) network providing wavelengths as services, an optical transport network (OTN) providing ODUk as services or a SDH/Sonet-network providing virtual containers (VC-n) or synchronous transport signals (STS-n) as services. The transmitting and receiving optical network elements 100, 200 may correspond to any ports of an optical network, e.g. Ethernet or TDM client ports or OTN DWDM/CWDM line ports of an optical transport system.

The transmitting optical network element 100 receives a payload signal 20 containing data to be transmitted to the receiving optical network element 200. The transmitting optical network element 100 comprises an encrypting entity 110 which is adapted to perform the encryption procedures in order to encrypt the received payload signal 20. Preferably, a digital electrical signal received at the transmitting optical network element 100 is encrypted. After encrypting, the signal is converted in an optical signal and transmitted to the receiving optical network element 200. Within the receiving optical network element 200, the optical signal is converted into the electrical domain and decrypted in order to obtain the payload signal 30.

The receiving optical network element 200 comprises a decrypting entity 210 performing decryption procedures in order to obtain the payload signal out of the encrypted payload. The optical system 1 is adapted to perform a hybrid encryption in order to obtain a high cryptographic security level along with a high flexibility in changing the connectivity between a transmitting optical network element 100 and a receiving optical network element 200.

Each transmitting optical network element 100 and each receiving optical network element 200, in the present example, the optical network element 100 and receiving optical network element 200 is connected to key management entity 10 which is adapted to generate key information, namely asymmetric key information comprising a key pair for each transmitting and receiving optical network element 100, 200. Specifically, the key management entity 10 is adapted to generate a public key and a private key for each transmitting and receiving optical network element 100, 200. Public and private key pairs are created as defined by the used asymmetric encryption scheme, e.g. the RSA algorithm as defined in standard IEEE P1363.

Said generation of the key pair has only to be performed once, e.g. after installation of a transmitting optical network element 100 or a receiving optical network element 200. According to the embodiment of FIG. 1, the key management entity 10 transmits the public key of the receiving optical network element 200 to the transmitting optical network element 100. Additionally, the receiving optical network element 200 receives its own private key generated and transmitted by the key management entity 10. Generally, in optical systems comprising a plurality of optical network elements (transmitting optical network elements, receiving optical network elements or transmitting and receiving optical network elements), the key management entity 10 transmits to each optical network element its own private key and the public keys of all other optical network elements. Preferably, the transmission of the private key to the respective optical network element is performed using a secure transmission line, preferably an encrypted transmission path. The public key information may be transmitted via an unsecure transmission line because the public key is public information. After generating and transmitting said key information, key management entity 10 may be switched to standby mode until new key information is required (e.g. after including a new optical network element into the optical system).

Furthermore, the transmitting optical network element 100, specifically, the encrypting entity 110 of the transmitting optical network element comprises a key generation entity 120, which is adapted to generate a symmetric encryption key. Said symmetric encryption key may be used in the transmitting optical network element 100 for encrypting the payload, and in the receiving optical network element 200 for decrypting the payload. The key generation entity 120 may include a cryptographically secure pseudo-random number generator (CSPRNG). Said CSPRNG may be adapted to provide pseudo-randomness with sufficient entropy and statistical randomness. It may be based on existing standards, e.g. FIPS 186-2 or NIST SP 800-90A. The key generation entity 120 may be implemented in hardware or software e.g. by a processor, a FPGA, an operating system etc. . . . . Preferably, the key generation entity 120 is located close to the encrypting entity 110 or within the encrypting entity 110, e.g. on the same hardware entity that performs the encryption. Thereby, transmission of the generated symmetric encryption key via potentially unsecure and unsafe channels is avoided.

The symmetric encryption key generated by the key generation entity 120 together with the key information generated by the key management entity 10 forms the encryption keys of the hybrid encryption applied within the optical system. The goal of hybrid encryption is to transmit the payload as well as the symmetric encryption key to the receiving optical network element 200 in a secure way. The symmetrical encryption key is used to encrypt the payload at the transmitting optical network element 100. In order to enable the receiving optical network element 200 to decrypt the encrypted payload, the symmetrical encryption key, which is generated at the transmitting optical network element 100, has to be transported safely and securely to the receiving optical network element 200. Said safe and secure transport is realized by encrypting the symmetrical encryption key by means of the asymmetric key information generated by the key management entity 10. Specifically, the transmitting optical network element 100 encrypts the symmetric encryption key by means of the public key associated with the receiving optical network element 200. After transmission of the encrypted symmetric encryption key to the receiving optical network element 200, the decrypting entity 210 decrypts the symmetric encryption key using its own private key. Subsequently, said decrypted symmetric encryption key is used for decrypting the encrypted payload in order to derive the payload signal 30. Preferably, the asymmetric key information is only used for the encrypted transport of the symmetric encryption key from the transmitting optical network element 100, generating said symmetric encryption key, to the receiving optical network element 200. Alternatively, the asymmetric key information can be also useful for other encryption, authentication or other tasks.

In the foregoing, it has been assumed that the transmitting optical network element 100 is adapted for transmitting an optical signal containing an encrypted payload and an encrypted symmetric encryption key, whereas the receiving optical network element 200 is adapted for receiving an optical signal containing an encrypted payload and an encrypted symmetric encryption key. However, it is also possible that the optical network elements are adapted as transceivers thereby being able to transmit and receive optical data containing encrypted payload. Thereby, a bidirectional encrypted communication between at least two optical network elements is possible. Each of said optical network elements may comprise an encrypting entity and a decrypting entity. Specifically, each optical network element may comprise a key generation entity for generating a symmetric encryption key used for encrypting the payload to be transmitted. The bidirectional communication between two of said optical network elements adapted as transceivers may use the same symmetric encryption key for both directions or a specific symmetric encryption key for each direction.

Depending on the encryption scheme for encrypting the payload, the symmetric encryption key may be a session key being valid for a predefined period of time, or until some event requires or triggers the replacement of the currently used symmetric encryption key. After that predefined time has elapsed or event occurs, a new symmetric encryption key is generated by the key generation entity 120 and transmitted to the receiving optical network element 200. Encrypting entity 110 and decrypting entity 210 may use procedures to agree on the point of time when to switch from the previously used to the new symmetric encryption key, thus supporting key replacement during uninterrupted encrypted communication.

Figure 2:
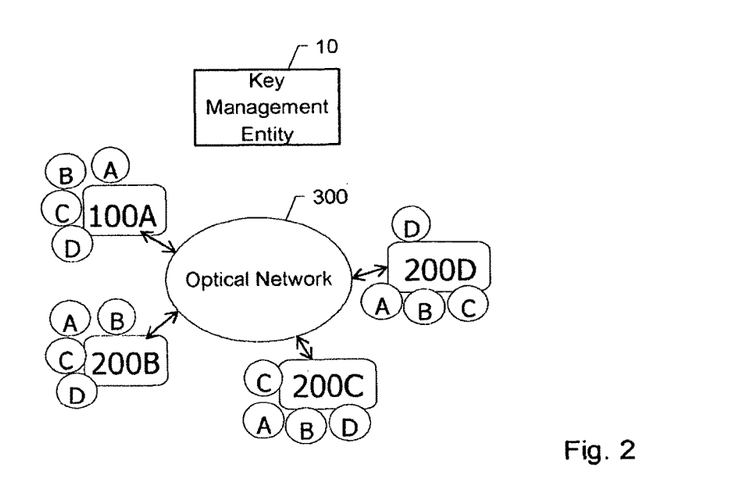
FIG. 2 schematically shows an association of asymmetric key information to a plurality of optical network elements before the addition of a new optical network element.

FIG. 2 shows a schematic diagram of the optical system 1 comprising optical network elements 100A, 200B, 200C, 200D connected via the optical network 300. According to a first embodiment, the optical network element 100A may be a transmitting optical network element and the further optical network elements 200B, 200C, 200D may be receiving optical network elements. According to a further embodiment, all optical network elements 100A, 200B, 200C, 200D are adapted as transceivers for transmitting and receiving encrypted optical data. Each optical network element 100A, 200B, 200C, 200D comprises its own private key and the public keys of all other optical network elements.

Figure 3:
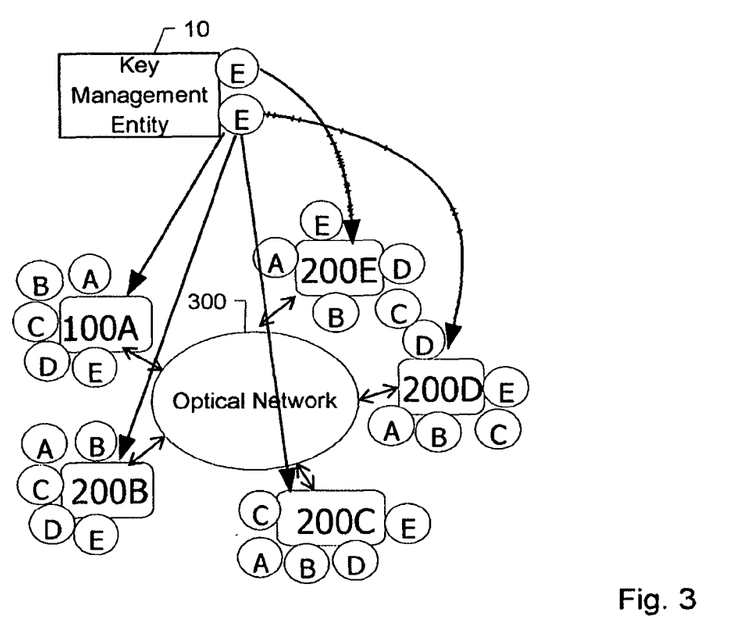
FIG. 3 schematically shows an association of asymmetric key information to a plurality of optical network elements after the addition of a new optical network element.

FIG. 3 shows the situation when new optical network element 200E is included within the optical system 1. The key management entity 10 generates a new asymmetric key pair comprising a private key and a public key of the new optical network element 200E. The private key is transmitted by the key management entity 10 to the new optical network element 200E, and the public key is transmitted to all other optical network elements 100A, 200B-200D. Furthermore, the public keys associated to the optical network elements 100A, 200B-200D are transmitted to the newly generated optical network element 200E. After said assignment of the private and public keys, the key management entity 10 may be switched in standby mode until a new asymmetric key pair is needed.

Figure 4:
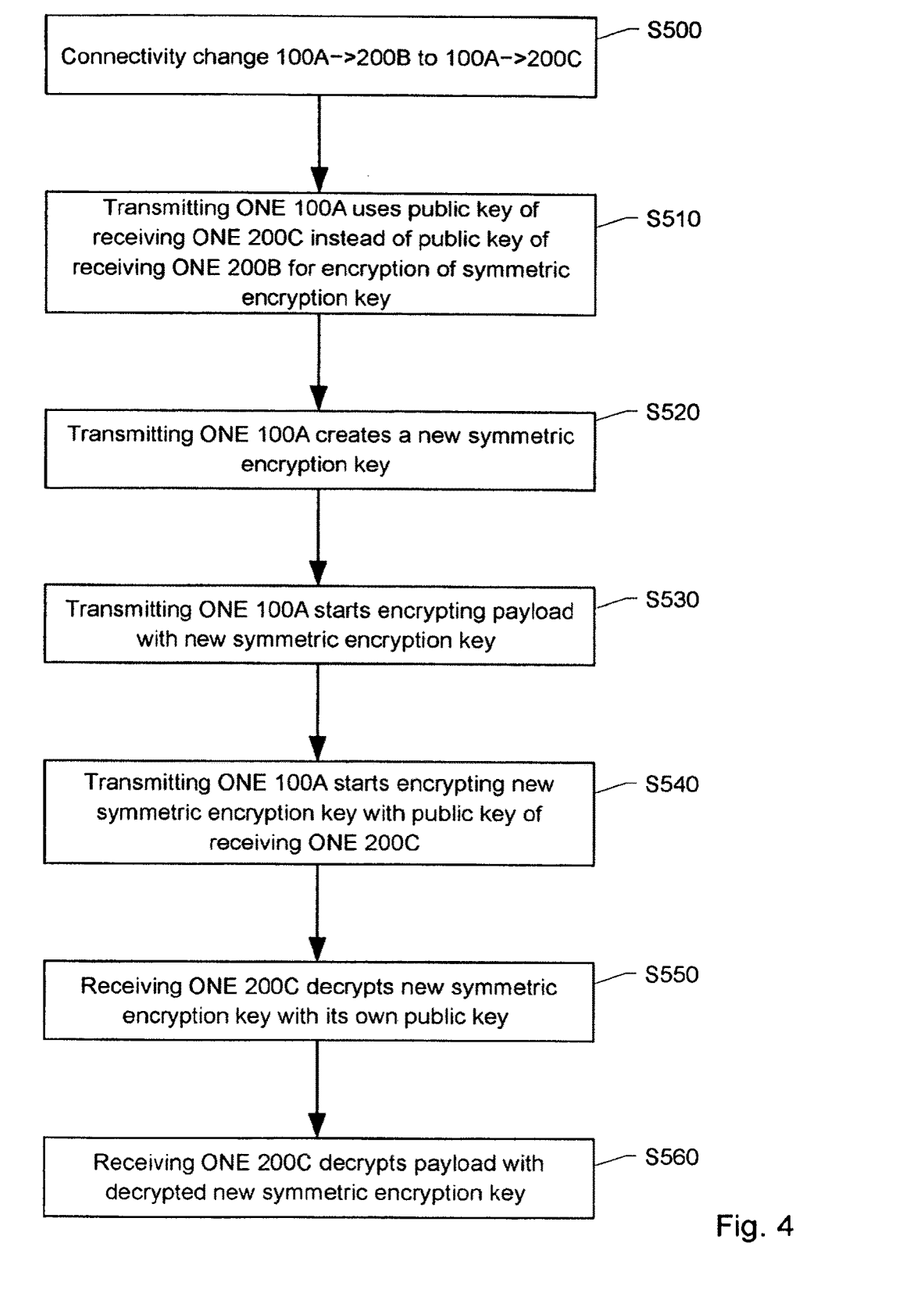
FIG. 4 schematically shows an example connectivity change scenario by means of a flow diagram.

FIG. 4 shows a flow diagram for illustrating a connectivity change. The data connection between a transmitting optical network element 100A and a first receiving optical network element 200B is changed to a second receiving optical network element 200C. In step S500, the transmitting optical network element 100A is informed of the changed connectivity from receiving optical network element 200B to receiving optical network element 200C. Said information may be transmitted as an in-band information to the transmitting optical network element 100A or using a GMPLS control plane etc. . . . Specifically, the transmitting optical network element 100A is informed about the identity of the new receiving optical network element 200C in order to enable the transmitting optical network element 100A to select the correct public key associated to the new receiving optical network element 200C for encrypting the symmetric encryption key. The information of the new receiving optical network element 200C may be given by a central network controlling instance, e.g. the network controlling instance which reconfigures the connectivity in the optical network 300, or by a distributed mechanism that influence the connectivity in the optical network 300 (e.g. GMPLS control plane).

After receiving the connectivity change information, transmitting optical network element (ONE) 100A stops using the public key associated with the first receiving optical network element (ONE) 200B for encrypting the symmetric encryption key and starts using the public key associated with the second receiving optical network element 200C (step S510). Thereby, the first receiving optical network element 200B is not able any more to decrypt the encrypted symmetric encryption key in order to avoid that a new generated symmetric encryption key (generated in the following in step S520) is decrypted by the first receiving optical network element 200B. It is worth mentioning, that the public key associated with the second receiving optical network element 200C is already stored in a storage means of the transmitting optical network element 100A because of a prior transmission initiated by the key management entity 10, i.e. actually no transmission of the public key is necessary at the time of switching the connectivity. From this point of time, the first receiving optical network element 200B is not able to decrypt the symmetric encryption key transmitted by the transmitting optical network element 100A anymore.

As a next step (S520), the transmitting optical network element 100A generates locally a new symmetric encryption key by means of its key generation entity. As already mentioned before, the symmetric encryption key may be a pseudo-random number which is generated at the point of time, when a new symmetric encryption key is needed ("fresh key"). At this point of time only the encrypting entity 110 of the transmitting optical network element 100A has the knowledge of the symmetric encryption key. Advantageously, the symmetric encryption key is locally generated by the entity which performs the encryption of payload. Therefore, no transmission of the symmetric encryption key is necessary.

After generating the symmetric encryption key, the transmitting optical network element 100A starts encrypting the payload by means of the new generated symmetric encryption key (step S530). After this point of time, the first receiving optical network element 200B is no longer able to decrypt the payload.

Next, the transmitting optical network element 100A starts encrypting the new generated symmetric encryption key with the public key of the second receiving optical network element 200C (step 540). Thereby it is possible to transmit the new generated symmetric encryption key to the second receiving optical network element 200C in a secure manner.

After receiving the encrypted new symmetric encryption key, the second receiving optical network element 200C is able to decrypt the encrypted new symmetric encryption key using its own private key (step S550).

Finally, after deriving the new symmetric encryption key, the decrypting entity 210 of the receiving optical network element 200C is able to decrypt the payload which was encrypted by the same new generated encryption key (step S560).

It should be noted that the sequence of the above steps may be changed. For example, the encrypted new symmetric encryption key may be transmitted to the receiving network element before payload encrypted with this encryption key is transmitted, e.g. in a separate control message. Other modifications of the disclosed steps are possible.

Preferably, according to the proposed methods and systems, connectivity changes can be carried out in a short period of time t e.g. t<200 ms, most preferably t<50 ms. Thereby a flexible encrypted optical system may be provided which can handle frequent changes of connectivity between a plurality of optical network elements, for example using GMPLS control plane or SDN (software-defined networking) driven networks.

According to embodiments, the encrypted symmetric encryption key is transmitted simultaneously with the encrypted payload which was encrypted using said symmetric encryption key. The main advantage of the simultaneous transmission is that in case of a change of the symmetric encryption key there is no or essentially no loss of data because the actually valid symmetric encryption key is linked with the encrypted payload and therefore the encrypted payload can be decrypted promptly using said actually valid symmetric encryption key. In addition, the encrypted symmetric encryption key may also be transmitted continuously with the encrypted payload. Thereby the symmetric encryption key is always available at the receiving optical network element 200B-200D, so even in unforeseen circumstances, e.g. a short-term breakdown of the receiving optical network element 200B-200D causing a loss of the symmetric encryption key, said symmetric encryption key can be recovered instantly.

Figure 5:
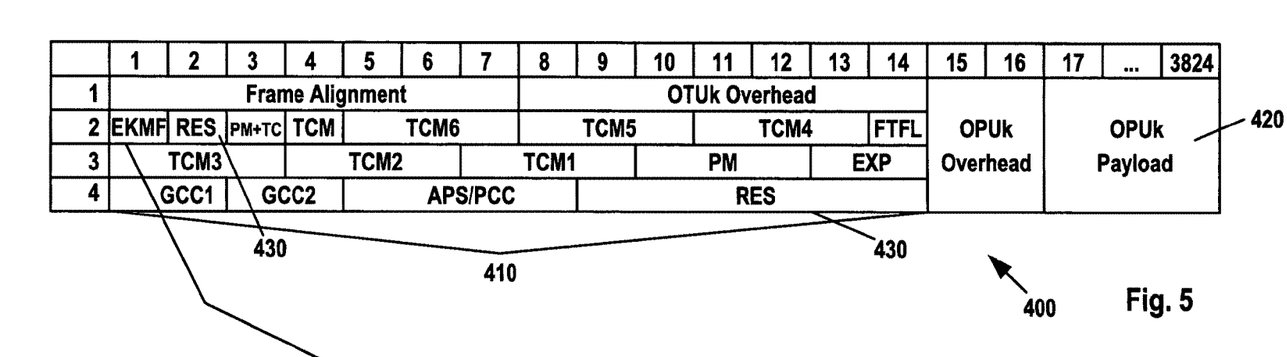
FIG. 5 schematically shows a possible data frame containing payload data and encrypted symmetric encryption key data.

Preferably, the encrypted payload is transmitted using a data frame structure 400 comprising a payload section 420 and the overhead section 410. The encrypted payload may be mapped into the payload section 420 and the actual encrypted symmetric encryption key may be mapped into the overhead section 410 of the data frame structure 400.

FIG. 5 shows the data structure of an optical transport network (OTN) on the basis of an Optical Channel Data Unit-k (ODUk). The ODUk comprises a payload section called OPUk payload 420 (OPUk: optical channel payload unit k) in which the encrypted payload is mapped. Furthermore, the ODUk comprises an overhead section 410, in which supplementary information can be transmitted. Said ODUk overhead 410 comprises a plurality of RES-bytes 430 which are reserved for future international standardization. The encrypted symmetric encryption key may be mapped into at least one byte of said RES-bytes.

The number of bytes necessary for transmitting the encrypted symmetric encryption key mainly depends of the key length of the used symmetric encryption scheme, and the used asymmetric encryption scheme used to encrypt the symmetric encryption key. Assuming an AES256 encryption (AES: Advanced Encryption Standard), the encrypted symmetric encryption key may comprise e.g. 256 bits (=32 bytes) which need to be transported. Depending on the mode of operation of the used encryption scheme, e.g. CTR mode of AES256, additional information need to be transferred from the transmitting optical network element 100A to the receiving optical network element 200B-200E. Said additional information and/or the mode of operation of the used encryption scheme may be also transmitted using the ODUk overhead.

Figure 6:
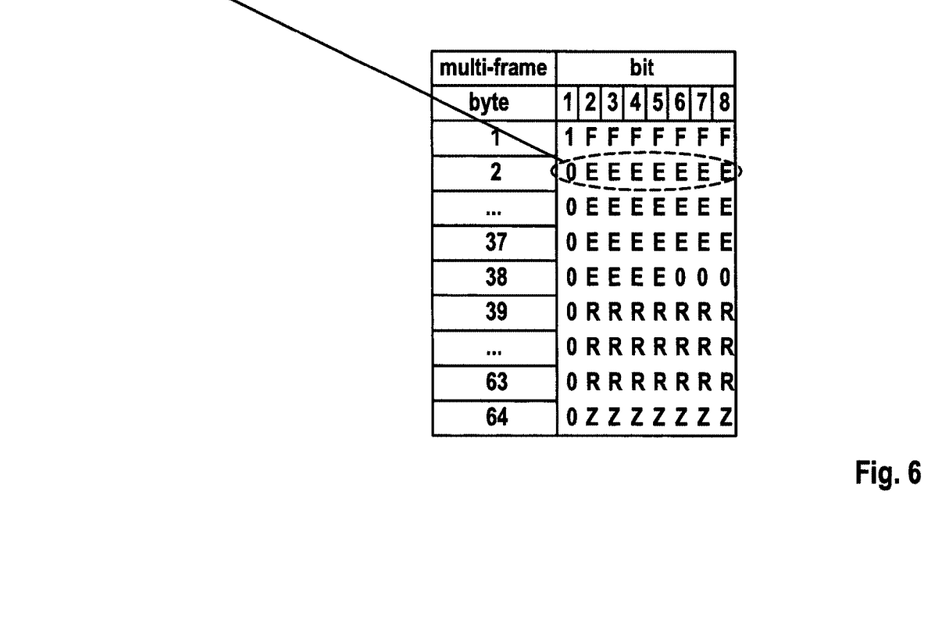
FIG. 6 schematically shows an example for a structure of a multi-frame for transmitting encrypted symmetric encryption key data.

Because of the limited transmission capacity within the ODUk overhead (only 8 RES-bytes available in the ODUk overhead of a frame) it may be necessary to use multi-framing for transmitting the encrypted symmetric encryption key (EKMF: encrypted key multi-frame). Thereby each byte of the multi-frame is transmitted using subsequent ODUk. FIG. 6 shows the structure of an example multi-frame which can be used to transmit an encrypted symmetric encryption key comprising 32 bytes (e.g. AES256 key). According to the shown example, the multi-frame comprises 64 bytes. As a matter of course, also other lengths of the multi-frame are possible. In FIG. 6, the rows show bytes 1-64 of the multi-frame, wherein the columns show the bits of each byte. In the current embodiment, the first bit of each byte indicates the multi-frame boundary, wherein the logical state of first bit indicates if the multi-frame is started or continued. For example, a high-bit ("1") indicates the start of the multi-frame and a low-bit ("0") indicates the continuation of the multi-frame.

The following bits 2-8 of byte 1 (indicated with "F") are for example flags. Said flags may be used as key exchange indicator, i.e. as indication that a new symmetric encryption key is available.

The bits starting at byte 2, bit 2 to byte 38, bit 5 (indicated with "E") are the bits used for transmitting the encrypted symmetric encryption key. The remaining bits 6-8 of byte 38 are set to 0.

The bytes 39 to 63 (bits indicated with "R") are reserved bits which may be used to transmit additional or supplementary information, e.g. information regarding the mode of operation of the used encryption scheme (CTR-mode of AES encryption).

Finally, the multi-frame may comprise a checksum over bits 2-8 of bytes 1-63 in order to detect a failure occurred during the transmission of the multiframe (e.g. Cyclic Redundancy Check (CRC), specifically CRC7). Said checksum may be contained in bits 2-8 of byte 64 (bits indicated with "Z").

Figure 7:
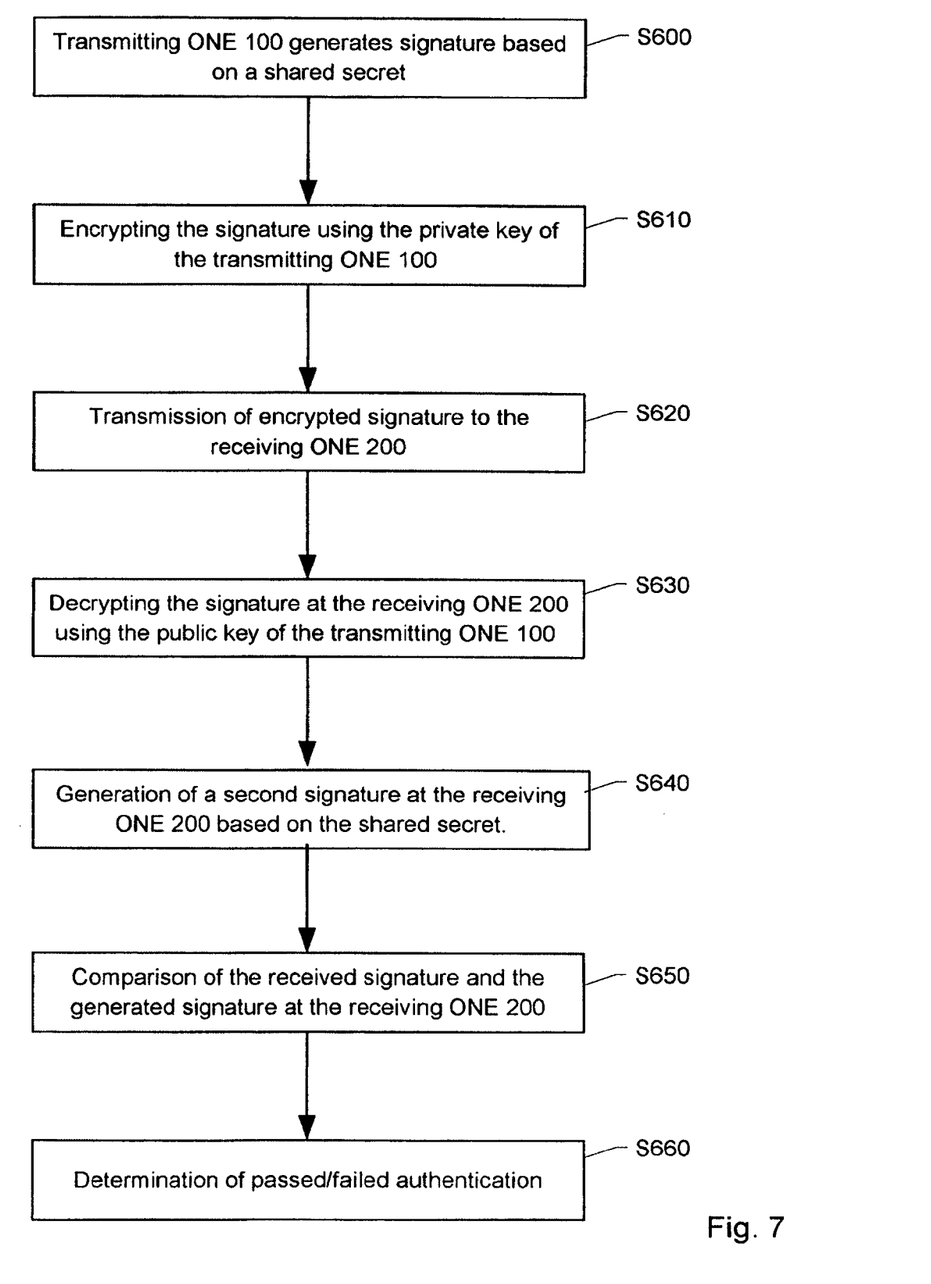
FIG. 7 schematically shows an example authentication procedure by means of a flow diagram.

In order to detect denial-of-service and man-in-the-middle attacks, an authentication procedure may be implemented. Said authentication may ensure that the transmitting optical network element 100A and the receiving optical network element 200B-200E are connected and no further optical network element located in the middle between said communicating optical network elements taps the transmitted data. FIG. 7 illustrates the authentication procedure by means of a flow diagram. Assuming that a transmitting optical network entity (ONE) 100 may transmit data to a receiving optical network entity (ONE) 200, the transmitting optical network element 100 generates a signature of some information that is only known by itself and the receiving optical network element 200 (shared secret). Said information may be the unencrypted or encrypted symmetric encryption key. In order to generate the signature, a cryptographic hash function may be applied on said information, e.g. on the unencrypted or encrypted symmetric encryption key (step S600).

Afterwards, the generated signature may be encrypted. Said encryption may be performed by using the private key of the transmitting optical network element 100 (step S610).

In the following, the encrypted signature may be transmitted to the receiving optical network element 200 via the optical network 300 (step S620).

After reception of the encrypted signature at the receiving optical network element 200, said receiving optical network element 200 may perform a decryption based on the public key of the transmitting optical network element 100 (step S630). Additionally, the received decrypted signature may be stored within the receiving optical network element 200.

Subsequently, the receiving optical network element 200 may generate a signature based on the same information, which was used by the transmitting optical network element 100 for generating the signature (step S640). The generation of the signature is performed identically, i.e. the transmitting optical network element 100 and the receiving optical network element 200 perform the same procedure for generating the signatures, e.g. a cryptographic hash function.

Finally, the generated signature is compared with the received decrypted signature stored within the receiving optical network element 200 (step S650). Based on the result of the comparison the success or failure of the authentication is determined (step S660). If the generated signature is identical with the received decrypted signature, it is assumed that the transmitting optical network element 100 (and not the man-in-the-middle) transmitted the payload. Otherwise it can be suspected that another optical network element than the intended transmitting optical network element 100 has sent the traffic to the receiving optical network element 200, indicating the potential for a denial-of-service or man-in-the-middle attack.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof. If not explicitly indicated otherwise, embodiments of the invention can be freely combined with each other.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A transmitting optical network element comprising:
   an interface adapted to receive key information from a key management entity;
   a storage means adapted to store a public key received from the key management entity, wherein the public key is associated with a receiving optical network element connectable to the transmitting optical network element via an optical network to transmit data; and
   a key generation entity configured to generate a symmetric encryption key;
   wherein the transmitting optical network element is adapted to:
   receive a payload to be transmitted to the receiving optical network element;
   encrypt the received payload using the generated symmetric encryption key;
   encrypt the generated symmetric encryption key using the public key of the receiving optical network element; and
   transmit the encrypted payload and the encrypted symmetric encryption key via the optical network to the receiving optical network element, wherein the encrypted payload is transmitted using data frames, and wherein the encrypted symmetric encryption key is embedded in some or all of the data frames and transmitted using an Optical channel Data Unit-k (ODU-k) overhead associated to an optical channel payload unit-k (OPU-k).

2. The transmitting optical network element of claim 1, wherein the storage means are adapted to store a private key associated with said transmitting optical network element and public keys of a plurality of receiving optical network elements being adapted to receive data of said transmitting optical network element.

3. The transmitting optical network element of claim 1, wherein in case of a change of connectivity from a first receiving optical network element to a second receiving optical network element, the transmitting optical network element is adapted to generate a new symmetric encryption key for encrypting payload and to encrypt the new symmetric encryption key using a public key of the second receiving optical network element.

4. The transmitting optical network element of claim 1, wherein information on the encrypted symmetric encryption key or at least a part of the encrypted symmetric encryption key is transmitted simultaneously and/or continuously with the encrypted payload.

5. The transmitting optical network element of claim 1, further comprising means for authenticating the received key information from a key management entity.

6. The transmitting optical network element of claim 1, adapted to:
   create a signature of a shared secret only known by the transmitting optical network element and the receiving optical network element;
   encrypt the signature with an own private key of the transmitting optical network element; and
   transmit the encrypted signature to the receiving optical network element to allow authentication at the receiving optical network element.

7. The transmitting optical network element of claim 6, adapted to create the signature of a shared secret by applying a cryptographic hash function.

8. A receiving optical network element being connected to a transmitting optical network element to receive data, the receiving optical network element comprising:
- an interface adapted to receive key information from a key management entity;
- a storage means adapted to store at least an own private key received from the key management entity;
- wherein the receiving optical network element is further adapted to:
  - receive an encrypted symmetric encryption key and an encrypted payload from the transmitting optical network element via an optical network, wherein the encrypted payload is received as data frames, the encrypted symmetric encryption key being embedded in some or all of the data frames and received in an Optical channel Data Unit-k (ODU-k) overhead associated to an optical channel payload unit-k (OPU-k);
  - decrypt the received symmetric encryption key using the own private key; and
  - decrypt the received encrypted payload using the decrypted received symmetric encryption key.

9. The receiving optical network element according to claim 8, wherein the storage means are adapted to store at least the own private key and at least one public key received by the key management entity, and wherein the at least one public key is associated with a transmitting optical network element being connectable to the receiving optical network element to transmit data.

10. The receiving optical network element according to claim 8, adapted to:
- receive a signature of a shared secret only known by the transmitting optical network element and the receiving optical network element, wherein the signature is encrypted by a private key of the transmitting optical network element;
- decrypt the signature with a public key of the transmitting optical network element;
- generate a second signature of the shared secret; and
- compare the decrypted signature with the second signature to authenticate the transmitting optical network element.

11. A method for encrypted transmission of data in an optical network comprising a transmitting optical network element and a receiving optical network element, the method comprising the steps of:
- receiving asymmetric key information from a key management entity by the transmitting optical network element and the receiving optical network element, wherein the asymmetric key information received by the transmitting optical network element comprises at least a public key of the receiving optical network element and the asymmetric key information received by the receiving optical network element comprises at least the private key of said receiving optical network element;
- receiving a payload to be encrypted by the transmitting optical network element;
- generating a symmetric encryption key;
- encrypting the payload using the generated symmetric encryption key by means of the transmitting optical network element;
- encrypting the generated symmetric encryption key by means of the transmitting optical network element using the public key of the receiving optical network element;
- transmitting the encrypted payload and the encrypted symmetric encryption key via the optical network to the receiving optical network element, wherein the encrypted payload is transmitted using data frames, and the encrypted symmetric encryption key is embedded in some or all of the data frames and transmitted using an Optical channel Data Unit-k (ODU-k) overhead associated to an optical channel payload unit-k (OPU-k);
- decrypting the symmetric encryption key by the receiving optical network element using the private key of the receiving optical network element; and
- decrypting the encrypted payload by the receiving optical network element using the decrypted symmetric encryption key.

12. The method according to claim 11, wherein the optical network comprises a plurality of optical network elements, namely at least one transmitting optical network element and a plurality of receiving optical network elements, and the transmitting optical network element and each receiving optical network element receive an own private key and public keys of other optical network elements.

13. The method according to claim 11, wherein the encrypted symmetric encryption key is transmitted simultaneously and/or continuously to the receiving optical network element.

14. The method according to claim 11, wherein in case of a connectivity change from a first receiving optical network element to a second receiving optical network element,
- the transmitting optical network element performs the following steps:
  - encrypting the symmetric encryption key by using a public key of the second receiving optical network element instead of using a public key of the first receiving optical network element;
  - generating a new symmetric encryption key;
  - encrypting the payload with the new symmetric encryption key;
  - encrypting the new symmetric encryption key by using the public key of the second receiving optical network element; and
- the second receiving optical network element performs the following steps:
  - decrypting the new symmetric encryption key with the own private key of the second optical network element; and
  - decrypting the payload using the decrypted symmetric encryption key.

* * * * *